United States Patent [19]
Yamada

[11] 4,335,398
[45] Jun. 15, 1982

[54] DIGITAL COLOR CONTROL METHOD AND MACHINE
[75] Inventor: Mitsuhiko Yamada, Kyoto, Japan
[73] Assignee: Dainippon Screen Seizo Kabushiki Kaisha, Kyoto, Japan
[21] Appl. No.: 142,650
[22] Filed: Apr. 22, 1980
[30] Foreign Application Priority Data Apr. 23, 1979 [JP] Japan .................................. 54-49077
Apr. 23, 1979 [JP] Japan .................................. 54-49078
Apr. 23, 1979 [JP] Japan .................................. 54-49079

[51] Int. Cl.³ .............................................. G03F 3/00
[52] U.S. Cl. ................................................. 358/80
[58] Field of Search ......................................... 358/80

[56] References Cited
U.S. PATENT DOCUMENTS

4,075,662 2/1978 Gall .................................. 358/80 X

Primary Examiner—Robert L. Richardson
Attorney, Agent, or Firm—Zarley, McKee, Thomte, Voorhees & Sease

[57] ABSTRACT

A digital color control method and machine used in a picture reproducing machine, such as a color scanner, a color facsimile, or the like, wherein color separation picture data of primary colors are separated into color component data and a gray component data which is further divided into gray component separation data of primary colors by using memory tables, then the color and the gray components data are color-corrected independently by using memory tables to obtain color-corrected color separation data. Then, the gray component separation data are added to the color-corrected color separation data, thereby obtaining color-controlled color separation recording data for reproducing color separation reproduction pictures.

36 Claims, 12 Drawing Figures

DIGITAL COLOR CONTROL METHOD AND MACHINE

BACKGROUND OF THE INVENTION

This invention relates to a method and machine for controlling picture color in a digital manner, used in a picture reproducing machine such as a color scanner, a color facsimile, or the like.

In a conventional picture reproducing machine such as a color scanner, a color facsimile, or the like, a color control operation such as a masking, a color correction, and so forth, has been carried out in an analog manner by operating electronically picture signals obtained by scanning an original picture. This method has good stability, reliability, reproducibility, and the like, rather than a photographic method.

However, thereafter, more strict conditions of the stability, the reliability, the reproducibility, and so forth, have been required, but a conventional analog operational circuit could not meet these requirements because integrated operational amplifiers, registers, potensiometers, and many other elements of the analog operational circuit depend on temperatures and times used. Thus, after a long period time, while they are used, the stability, the reliability, the reproducibility, and the like, of these elements are deteriorated.

In order to overcome these problems, when the operational circuit are composed, the best grade of elements are used and temperature compensation circuits are added. However, this results in the complicated operational circuit, and accordingly, in general, the drop of the reliability, and high cost.

Then, in order to remove the stability, the reliability, the reproducibility, and so forth, a digital operational method has been proposed. In this method, the operation of the signals is performed in the real time processing at high speed, and the color correction is carried out by transforming, not calculating, quickly coordinates of input color separation signals R, G and B of additive primary colors such as red, green and blue into those of output color separation signals Y, M and C of the subtractive primary colors such as yellow, magenta and cyan corresponding thereto.

If each red, green and blue range is divided, for example, into $2^8$ tone steps, or each color is coded by eight bits, the capacity corresponding to altogether $2^{24}$ steps for a combination of three colors must be required, and consequently such a coordinates transformation method requires a memory having a large capacity. This means high cost, and thus is not practicable.

In this method, the coordinates transformation is performed by a three-dimentional memory table wherein the combination of three color recording digital signals Y, M and C are stored along three axes and are read out of the table by addressing by means of the combination of three color picture digital signals R, G and B corresponding thereto. This method is operated at the high speed, but, in practice, the capacity of the memory table is restricted.

Then, in order to reduce the capacity of the memory, an interpolation method has been applied. In this case, each red, green and blue range is divided more roughly into the tone steps in the three-dimentional coordinates and inermediate values between the steps are interpolated from the adjacent stored values corresponding to the combinations of the recording signals Y, M and C, which are read out of the memory of the combinations of the picture signals R, G and B corresponding thereto.

However, in this case, the relation between the picture and the recording signals is represented by a quadratic equation, but then, in practice, the interpolation is carried out linearly in the approximate manner. Accordingly, the errors of the approximate values interpolated are varried depending on the quadratic equation and are often beyond the acceptable limit range. In order to perform a faithful interpolation operation is required a complex interpolation method which takes much time. Thus, it is almost imposible to carry out this complex interpolation method in the real time processing.

On the other hand, the essential conditions for the color correction, when the picture reproducing machine such as a color scanner is operated, are itemized in the followings.

1. The color correction conditions are settled readily;
2. The color correction conditions are minimized;
3. Each color correction condition is independently settled;
4. The color correction conditions are obvious as compared with their standard values;
5. The color correction conditions are expressed easily in a specification;
6. The color correction conditions are maintained for a long period of time;
7. The same color correction conditions are obtained after a long period of operational time;
8. The color correction conditions are readily recorded in a recording medium such as a tape or a card; and
9. The data of the color correction conditions which has been obtained experientially by operating the color scanner are utilized continuously, and the other data will be joined in the previous data.

These items should be satisfied in the digital method. However, the conventional digital method could not satisfy all of these items.

For instance, in the conventional method utilizing the three-dimentional memory table, each color correction condition cannot be determined independently, and is closely related to the other color correction conditions. Therefore, if the part of the conditions is replaced, all of the table must be changed. This means a large number of tables are required for all of the possibilities of the color correction conditions. Further, when the interpolation is carried out, the color correction conditions are reflected on it. Thus, this is not practicable and high cost.

This digital processing is substantially a coordinates transformation from the combination of three color picture signals R, G and B to the combination of three color recording signals Y, M and C by a table, as described above, and the color correction conditions such as hue, saturation, brightness, color balance, and so forth, are related closely one another. Therefore, it is difficult to indicate the corrected amounts of these color correction conditions in the same manner as a conventional analog method.

From the above description, it is understood that the conventional digital color scanner cannot satisfy the above items 1, 3, 4, 5 and 9.

As regards the item 9, in particular, this is not an essential function of the color scanner, but is an important condition which decides whether the data obtained can be utilized continuously. The conventional digital method cannot satisfy this condition, which is a large inconvenience.

Further, in the conventional three-dimentional coordinates transformation process, if each picture signal R, G and B is coded by a binary code having 8 bits, each combination of three picture signals R, G and B corresponds to a binary code having 24 bits, whose capacity is $2^{24}$ imformation.

The color corresponding to the combination of three picture signals R, G and B is represented by brightness, saturation and hue, as is well-known, and the brightness has the maximum resolving power. In the conventional digital method, the brightness, saturation and hue are expressed by binary codes, each having 8 bits. However, the brightness and the saturation are represented by a pure color component and a gray color component including an equivalent gray density component, and hence the saturation possesses a redundancy, viz. the code of the saturation includes redundant bits. Meanwhile, in practice, when the resolving power of the hue may be reduced as compared with that of the brightness, the influences of the colors of the reproduction pictures may be ignored.

Accordingly, in the data processing, the sampling steps of the saturation and the hue may be pressurized, or settled more roughly, and thus these two may be represented by binary codes having 6 bits, i.e. altogether $2^{20}$ information for a combination of three color picture signals R, G and B is required.

SUMMARY OF THE INVENTION

It is an object of the present invention to provide a digital color control method used in a picture reproducing machine free from the aforementioned defects, which is simple, stable, reliable and reproducible, and which is capable of controlling color of each color separation signal of yellow, magenta, cyan or black, independently, by using memory tables.

It is another object of the present invention to provide a digital color control machine used in a picture reproducing machine free from the aforementioned defects, which is simple, stable, reliable and reproducible, and which is capable of controlling color of each color separation signal of yellow, magenta, cyan or black, independently, by using memory tables.

According to the present invention there is provided a digital color control method used in a picture reproducing machine, comprising the steps of (a) separating color separation picture data of primary colors into first color component data and a gray component data depending on the maximum value data of the color separation picture data, the first color component data indexing memory tables to output gray component separation data predetermined, which are stored therein, (b) color-correcting the first color component data and the gray component data by operating the first color component data, the gray component data, and color correction data predetermined, which are read out of memory tables by indexing the tables according to the first color component data, to obtain second color component data, and (c) adding the gray component separation data to the second color component data, thereby obtaining color-controlled color separation recording data for reproducing color separation reproduction pictures.

According to the present invention there is also provided a digital color control machine used in a picture reproducing machine, comprising (a) a color and gray components controller having memory tables in which gray component separation data predetermined are stored, which separates color separation picture data of primary colors into first color component data and a gray component data depending on the maximum value data of the color separation picture data, and in which the memory tables are indexed by the first color component data to output the gray component separation data, (b) a color correction controller having memory tables in which color correction data predetermined are stored, which color-corrects the first color component data and the gray component data by operating the first color component data, the gray component data, fed from the color and gray components controller, and the color correction data read out of the memory tables by indexing the tables according to the first color component data, to obtain second color component data, and (c) a data composer which adds the gray component separation data to the second color component data, thereby obtaining color-controlled color separation recording data for reproducing color separation reproduction pictures.

BRIEF DESCRIPTION OF DRAWINGS

In order that the present invention may be better understood, a preferred embodiment thereof will be described with reference to the accompanying drawings, in which.

DESCRIPTION OF A PREFERRED EMBODIMENT

Figure 1:
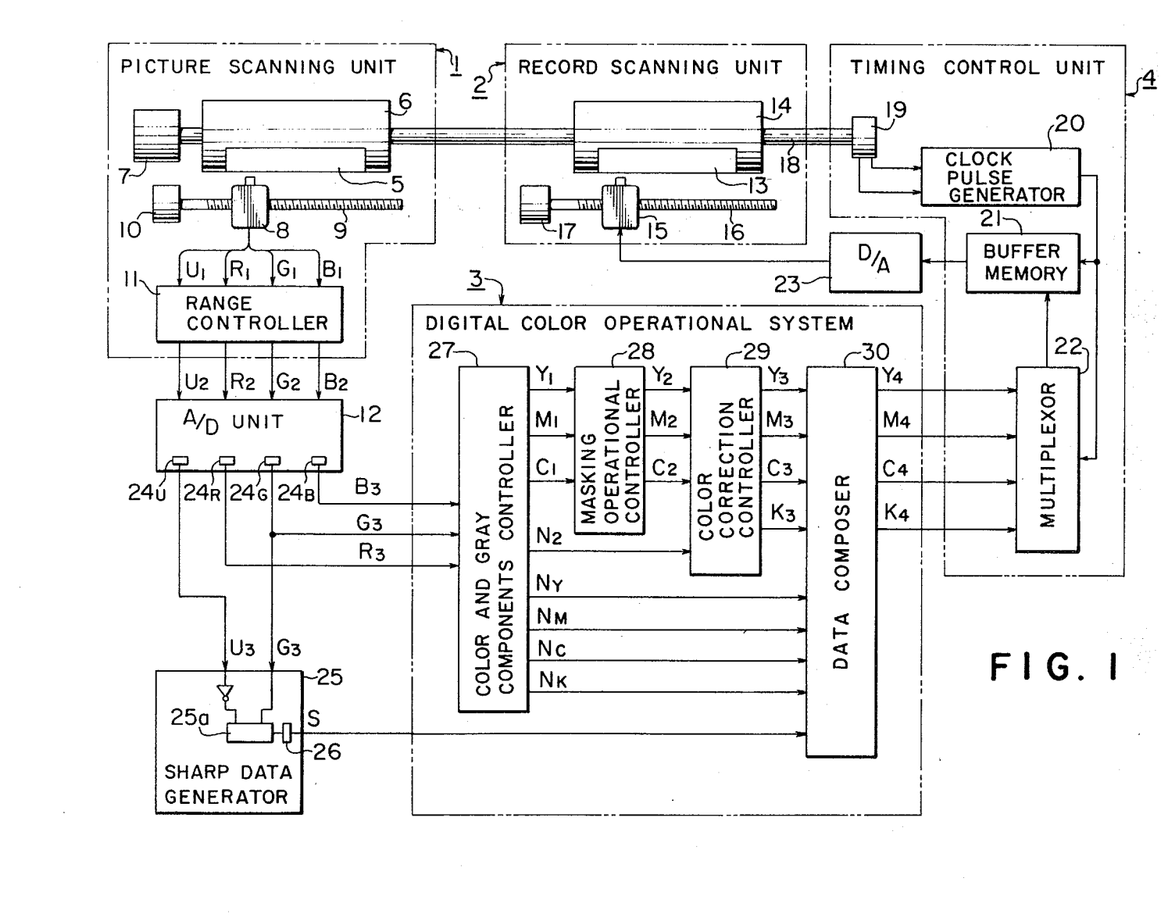
FIG. 1 is a schematic view of a color scanner including a digital color operation system according to the present invention.

Referring now to the drawings, there is shown in FIG. 1 a color scanner for carrying out a digital color control method according to the present invention, which comprises a picture scanning unit 1, a record scanning unit 2, a digital color operational system 3 and a timing control unit 4.

The picture scanning unit 1 of a conventional type comprises a picture cylinder 6 on which an original color picture 5 is secured, a drive motor 7 for rotating the picture cylinder 6 through a rotary shaft 18, a pickup head 8 having a color separator for scanning the original picture 5 to obtain an analog picture signal which is then separated therein into three color separation signals $R_1$, $G_1$ and $B_1$ and an unsharp signal $U_1$ in a conventional manner, a screw shaft 9 extending parallel with the axis of the picture cylinder 6 on which the pickup head 8 is movably mounted, a drive motor 10 for rotating the screw shaft 9, and a range controller 11 which logarithmically converts the signals $R_1$, $G_1$, $B_1$ and $U_1$ into picture density signals $R_2$, $G_2$, $B_2$ and $U_2$ and sets up shadow and highlight points so as to settle a certain range of the picture density signals.

Figure 2:
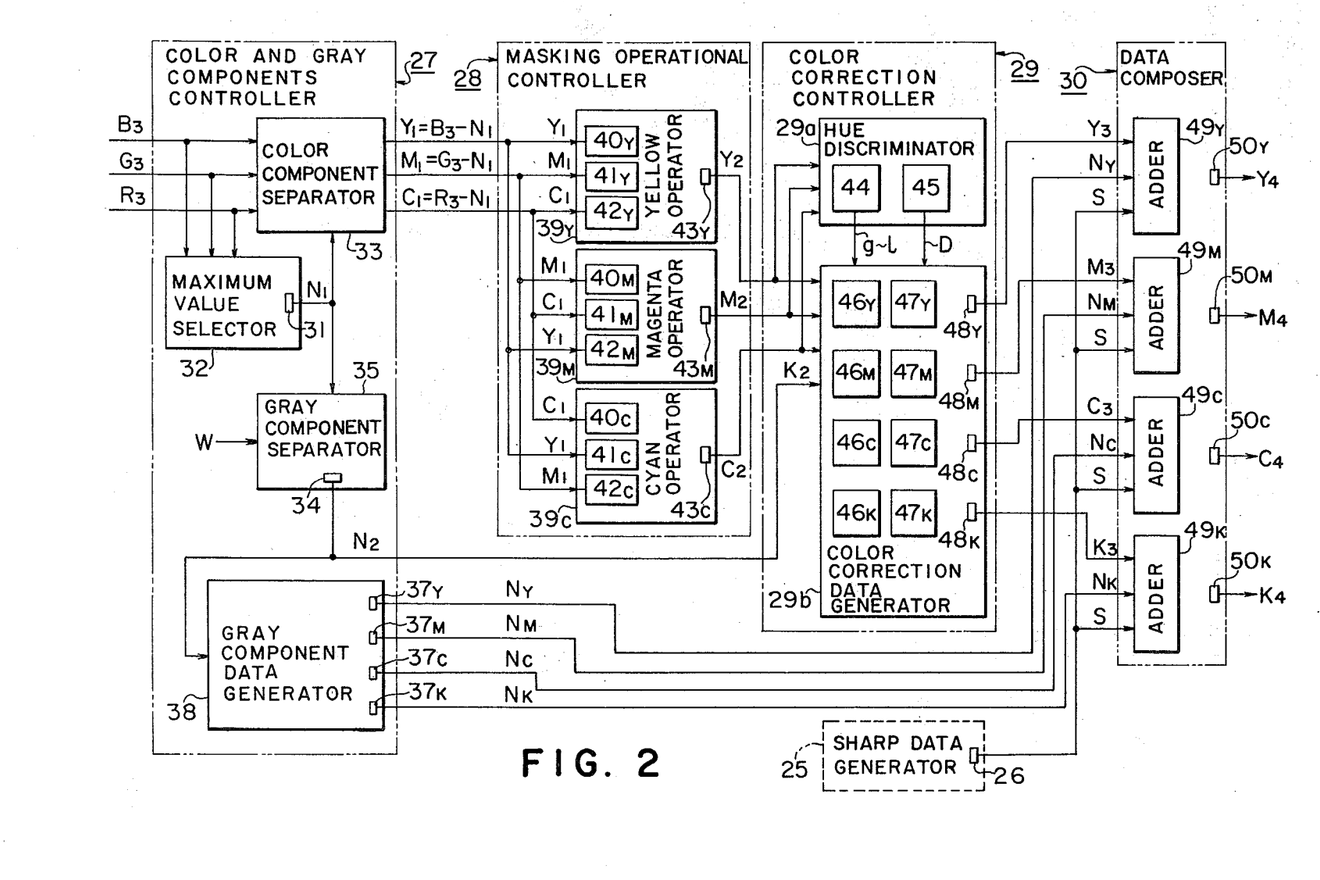
FIG. 2 is a block diagram of the digital color operation system in FIG. 1.

The picture density signals $R_2$, $G_2$, $B_2$ and $U_2$ are sent to an analog-digital converter unit 12, hereinafter referred to as a A/D converter, having latch circuits 24R, 24G, 24B and 24U. The minimum and the maximum input levels are adjusted by the range controller 11, as described above.

The record scanning unit 2 of a conventional type comprises a recording cylinder 14 which is coaxially arranged with the picture cylinder 6 via the rotary shaft 18, and on which a recording film 13 is mounted, a recording head 15 having a light source control means, for recording a reproduction picture on the recording film 13, a screw shaft 16 extending parallel with the axis of the recording cylinder 14, on which the recording head 15 is movably mounted, and a drive motor 17 for driving the screw shaft 16.

The digital color operational system 3 which is the essence of the present invention, comprises a color and gray components controller 27, a masking operational controller 28, a color correction controller 29, and a data composer 30, as hereinafter described in detail.

The timing control unit 4 of a conventional type comprises a rotary encoder 19 which coaxially arranged with the two cylinders 6 and 14 via the rotary shaft 18, and includes a timing pulse generator which generates a plurality of timing pulses per one rotation of the cylinders 6 and 14, and a one-rotation pulse generator which generates a one-rotation pulse per one rotation of the cylinders 6 and 14, a clock pulse generator 20 which receives the timing pulses and the one-rotation pulse from the rotary encoder 19 and outputs clock pulses having desired periods and pulse widths, a buffer memory 21 which receives the clock pulses from the clock pulse generator 20 and outputs a picture recording signal to the recording head 15 via a digital-analog converter 23, hereinafter referred to as a D/A converter, at a proper timing depending on the desired magnification, and a multiplexor 22 which selects a picture recording data of one of the ink colors, which is fed from the data composer 30, and sends it to the buffer memory 21.

The timing control of the motors 7, 10 and 17 for the cylinders 6 and 14, the pickup head 8 and the recording head 15 are carried out in a conventional manner, and thus the detail explanation thereof may be omitted for the simplicity of the description.

The recording cylinder 14 may be driven independently by another drive motor, if necessary, and, in this case, the timing control unit 4 should be connected to the recording unit 2.

In this case, the recording unit 2 records the reproduction picture on the recording film 13, but the reproduction picture may be displayed in a cathod ray tube, or the like.

In the A/D converter 12, the picture density signals $R_2$, $G_2$, $B_2$ and $U_2$ are converted into digital picture signals, i.e. binary coded data $R_3$, $G_3$, $B_3$ and $U_3$ in each color channels R, G, B and U and are latched in the latch circuits 24R, 24G, 24B and 24U in its end stage. In this embodiment, each data $R_3$, $G_3$, $B_3$ or $U_3$ having 8 bits is transferred in a bus line of each channel and is processed in the same time such as a real time processing, as is well-known.

The A/D converter 12 and the 8-bits latch circuits 24R, 24G, 24B and 24U therein are controlled in synchronization with the clock pulses generated by the clock pulse generator 20. The clock pulse possesses a period upon which a resolving power desired to the scanner depends, and is used as a principal clock pulse in the operational system 3 wherein the data is processed in the sampling period of the clock pulse in a real time processing.

One of the three data $R_3$, $G_3$, and $B_3$, for instance, the data $G_3$, and the data $U_3$ are sent to a sharp data generator 25 having a subtractor 25a and a 8-bits latch circuit 26 which is capable of synchronizing the data operation speed with that in the operational system 3. The sharp data generator 25 operates a detail emphasis data S for imparting specific sharpness effect to the reproduction picture by deducting the data $U_3$ including an unsharp component from the data $G_3$ including a sharp component in the subtractor 25a in the similar manner to the analog method, and the detail emphasis data S is latched in the latch circuit 26. The detail emphasis data S is added to ink color data color-corrected in the data composer 30 at the end of the color operation process, as described later.

The data $R_3$, $G_3$ and $B_3$ are fed from the latch circuit 24R, 24G and 24B to the digital color operational system 3 in which the data $R_3$, $G_3$ and $B_3$ are consecutively controlled in the color and gray components controller 27, the masking operational controller 28, the color correction controller 29, and then the data composer 30, as hereinafter described.

The color and gray components controller 27 separates the three color data $R_3$, $G_3$ and $B_3$ into color and gray component data, and comprises a maximum value selector 32 having a 8-bits latch circuit 31, which selects one data having the maximum value of the color data $R_3$, $G_3$ and $B_3$, i.e. $N_1=(R_3,G_3,B_3)max$, and latches the data $N_1$ in the latch circuit 31; a color component separator 33 which separates and output ink color recording data $Y_1$, $M_1$ and $C_1$ corresponding to the ink color including the hue and the saturation of the combination of the three color data $R_3$, $G_3$ and $B_3$ depending on the data $N_1$ sent by the maximum value selector 32; a gray component separator 35 having a 8-bits latch circuit 34, which separates an equivalent gray density data $N_2=W-N_1$, wherein W means a reference white level data predetermined, representing an equivalent gray density component of the ink color corresponding to an equivalent gray density component of the combination of the data $R_3$, $G_3$ and $B_3$, by subtracting the maximum value data $N_1$ sent from the maximum value selector 32 from the reference white level data W, and the equivalent gray density data $N_2$ is latched in the latch circuit 34; and a gray component data generator 38 including memory tables 36Y, 36M, 36C and 36K and 8-bits latch circuits 37Y, 37M, 37C and 37K, for yellow, magenta, cyan and black ink colors, in which the memory tables 36Y, 36M, 36C and 36K are indexed by the equivalent gray density data $N_2$ to output gray component separation data Ny, Nm, Nc and Nk for yellow, magenta, cyan and black ink colors which are latched in the latch circuits 37Y, 37M, 37C and 37K, and then are sent to the data composer in order to be added to the color-corrected data.

The masking operational controller 28 carries out masking operation by using a masking equation, and comprises three color operators 39Y, 39M, and 39C for yellow, magenta and cyan, each operator 39Y, 39M or 39C including three memory tables 40Y, 41Y and 42Y; 40M, 41M and 42M; or 40C, 41C and 42C, and a 8-bits latch circuit 43Y, 43M or 43C. The memory tables 40Y, 41Y and 42Y are indexed in the same time by the ink color data $Y_1$, $M_1$ and $C_1$ fed from the color component separator 33 so as to output data which are summed to obtain a yellow data $Y_2$ which is latched in the latch circuit 43Y. Each combination of memory tables 40M, 41M and 42M; or 40C, 41C and 42C are indexed simultaneously by the ink color data $Y_1$, $M_1$ and $C_1$ in the same manner as described above, and a magenta or cyan data $M_2$ or $C_2$ is latched in the latch circuit 43M or 43C.

The color correction controller 29 performs color correction operations of the three ink color data $Y_2$, $M_2$ and $C_2$ sent from the masking operational controller 28, and comprises a hue discriminator 29a and a color correction data generator 29b. The hue discriminator 29a comprises a first color discriminator circuit 44 which divides the hue range of the data $Y_2$, $M_2$ or $C_2$ into some ranges such as six divisions, as described later, and a second color discriminator circuit 45 which further divides the hue range into small ranges such as 16 subdivisions, as hereinafter mentioned.

The color correction data generator 29b comprises four memory tables 46Y, 46M, 46C and 46K which are indexed by output signals from the discriminator circuits 44 and 45 to output color correction data $\Delta Y$, $\Delta M$, $\Delta C$ and $\Delta K$, four add-subtractors 47Y, 47M, 47C and 47K which add or subtract the correction data to or from the data $Y_2$, $M_2$, $C_2$ and $K_2 = N_1$ fed from the color operators 39Y, 39M and 39C and the gray component separator 35, in order to obtain the corrected data $Y_3$, $M_3$, $C_3$ and $K_3$, respectively, and four 8-bits latch circuits 48Y, 48M, 48C and 48K which latch the corrected data $Y_3$, $M_3$, $C_3$ and $K_3$ therein.

The data composer 30 comprises four adders 49Y, 49M, 49C and 49K, and four 8-bits latch circuits 50Y, 50M, 50C and 50K, for yellow, magenta, cyan and black color ink colors. The adders 49Y, 49M, 49C and 49K add the gray component separation data Ny, Nm, Nc and Nk sent from the gray component data generator 38 and the detail emphasis data S sent from the sharp data generator 25 to the color-corrected data $Y_3$, $M_3$, $C_3$ and $K_3$ fed from the color correction controller 29, thereby obtaining color-controlled color separation recording data $Y_4$, $M_4$, $C_4$ and $K_4$ of yellow, magenta, cyan and black ink colors, which are latched in the latch circuits 50Y, 50M, 50C and 50K.

The picture recording data $Y_4$, $M_4$, $C_4$ and $K_4$ are sent to the multiplexor 22, and then are selectively fed to the buffer memory 21. Then, the buffer memory 21 sends the picture recording signal to the recording head 15 through the D/A converter 23, and the recording head 15 records the color separation reproduction pictures on the recording film 13 on the recording cylinder 14, as shown in FIG. 1.

Now, the color and gray components control operation will be described in detail in connection with FIGS. 3-6.

Figure 3:
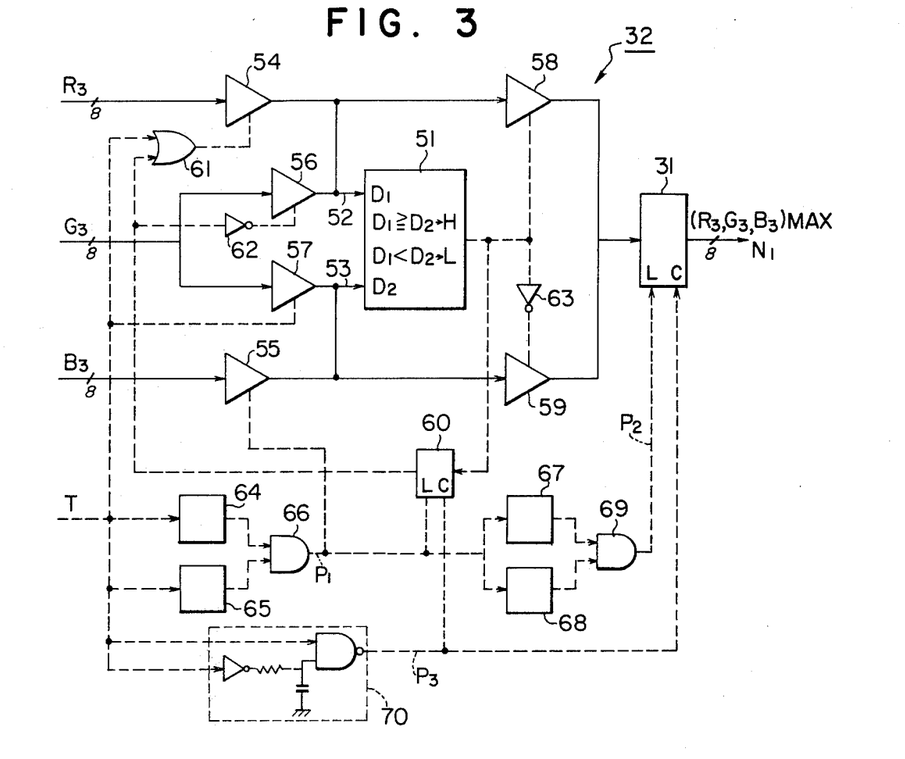
FIG. 3 is a block diagram of a maximum value selector in FIG. 2.

In FIG. 3 is shown the maximum value selector 32 including a 8-bits magnitude comparator 51. The two data $R_3$ and $B_3$ are sent to input terminals $D_1$ and $D_2$ of the magnitude comparator 51 via bus buffers 54 and 55 and bus lines 52 and 53. The data $G_3$ is selectively fed to the terminals $D_1$ and $D_2$ of the comparator 51 and to the 8-bits latch circuit 31 via the bus lines 52 and 53 and bus buffers 56, 57, 58 and 59. These bus buffers are of a conventional three states type.

The comparator 51 operates in two comparing modes with different timings. In the first comparing mode, the data $R_3$ and $G_3$ are fed to the terminals $D_1$ and $D_2$ of the comparator 51 through the buffer 54 and 56 and are compared therein. In the second comparing mode, the comparison result in the first comparing mode is sent from the coparator 51 to one-bit latch circuit 60 and is latched there just before finishing the first comparing mode. The larger data $R_3$ or $G_3$ is sent to the terminal $D_1$ of the comparator 51 via the bus buffer 54 or 56, one of which is forced to pass the data $R_3$ or $G_3$ by an output signal which is sent to the buffers 54 and 56 via an OR gate 61 and an inverter 62, from the latch circuit 60 depending on the comparison result latched therein. The data $B_3$ is fed to the terminal $D_2$ through the buffer 55.

Then, the comparator 51 compares the larger data $R_3$ or $G_3$ and the data $B_3$, and the comparison result in the second mode is sent from the comparator 51 to the buffers 58 and 59 directly and via a inverter 63 and allows the buffer 58 or 59 to pass the maximum data $N_1 = (R_3, G_3, B_3)$max to the latch circuit 31.

Figure 4:
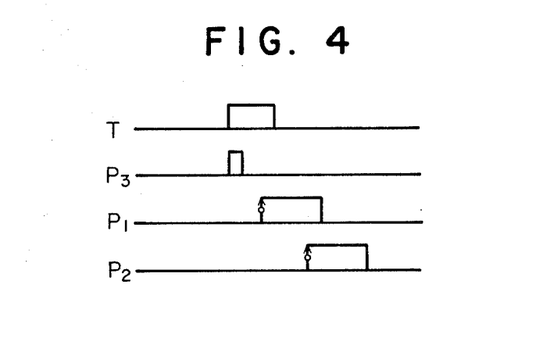
FIG. 4 is a time chart of pulses shown in FIG. 3.

In FIG. 4 are shown pulses T, P1, P2 and P3 for sequentially controlling the operation described above. The clock pulse T is generated by the clock pulse generator 20 or is made from the sampling pulse for the A/D converter 12. The pulse T has the same period as the sampling pulse for the A/D converter 12, and a pulse width which is shorter than the sampling period, and its leading edge is raised just after finishing the conversion of the signal in the A/D converter 12. The data $R_3$, $G_3$, $B_3$ and $U_3$ are latched in the latch circuits 24R, 24G, 24B and 24U in the A/D converter 12 in synchronization with the leading edge of the pulse T.

When the clock pulse T is sent to the buffers 54 and 57, i.e. the level of the clock pulse T is high, the data $R_3$ and $G_3$ are fed to the terminals $D_1$ and $D_2$ through the buffers 54 and 57. The comparator 51 outputs a high level signal H or a low level signal L when the data $R_3$ is equal to or larger than the data $G_3$, or former is smaller than the latter.

The comparison result in the comparator 51 in the first comparing mode is latched in the latch circuit 60 by using the pulse P1 for controlling the second mode, and the signal output from the latch circuit 60 is sent to enable terminals of the buffers 54 and 56.

To the enable terminal of the buffer 54 are input the clock pulse T via the OR gate 61 and the output signal from the latch circuit 60. To the enable terminal of the buffer 56 is input the output signal from the latch circuit 60 via the inverter 62.

In the second comparing mode, the larger data $(R_3, G_3)$max is selected by the pulse P1 to be passed to the comparator 51 through the buffer 54 or 56 depending on the output signal from the latch circuit 60. Further, the pulse P1 controls the buffer 55 so that the data $B_3$ may be sent to the terminal $D_2$ of the comparator 51. Then, the comparator 51 compares the data $(R_3,G_3)$max and the data $B_3$, and, when the former is equal to or larger than the latter, or the former is smaller than the latter, outputs the high level signal H or the low level signal L to the buffer 58 or 59 so that the buffer 58 or 59 may pass the data $(R_3,G_3)$max or the data $B_3$ to the latch circuit 31. The latch circuit 31 latches the maximum value data $N_1$ just before finishing the second comparing mode in synchronization with the leading edge of the pulse P2.

The pulse P1, the timing of its leading edge crossing over that of the trailing edge of the clock pulse T, is made from the clock pulse T by a combination of mono-stable multi-vibrators 64 and 65 and an AND gate 66. The pulse P2, the timing of its leading edge crossing over that of the trailing edge of the pulse P1, is made from the pulse P1 by a combination of mono-stable multi-vibrators 67 and 68 and an AND gate 69.

The clock pulse T is sent to a logic differential circuit 70 wherein the reset pulse P3 for differentiating the leading edge of the clock pulse T in the early timing of the clock pulse T is made, and the reset pulse P3 clears the latch circuits 31 and 60 just after the first comparing mode is started.

The maximum value selector 32 including the latch circuit 31 is capable of operating the maximum data $N_1=(R_3,G_3,B_3)$max in the minimum circulatory processing in a quicker manner rather than the sampling period of the signals in the A/D converter 12, and thus readily realizing the real time color operation and the synchronization with the following step.

Figure 6:
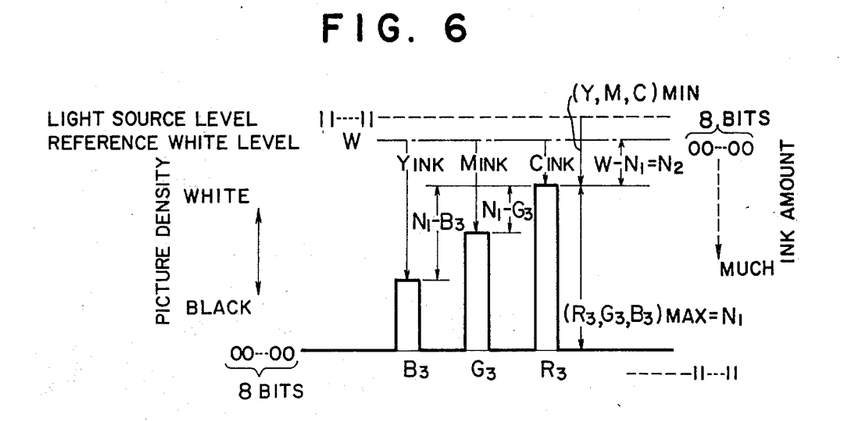
FIG. 6 shows a relation between three color picture signals R, G and B and three color recording signals Y, M and C.

As shown in FIG. 6, when the maximum data $N_1$ obtained in the maximum value selector 32 is converted into three color signals of Y,M,C system, it corresponds to a minimum data (Y,M,C)min of the complementary color of the maximum data $N_1$, and thus the maximum data $N_1$ corresponds to a gray density component of Y,M,C system, but the minimum data (Y,M,C)min has not a true gray density corresponding the data $N_2 = W - N_1$.

That is, the available maximum value of the signals set up in the range controller 11 is settled to the light source level in FIG. 6, for the original picture scanning, and the reference white level obtained at the maximum highlight point in the original picture is lower than the light source level. Accordingly, the true gray density data $N_2$ is determined according to the reference white level data W, viz. subtracting the maximum data $N_1$ from the reference white level data W in the gray component separator 35.

Figure 5:
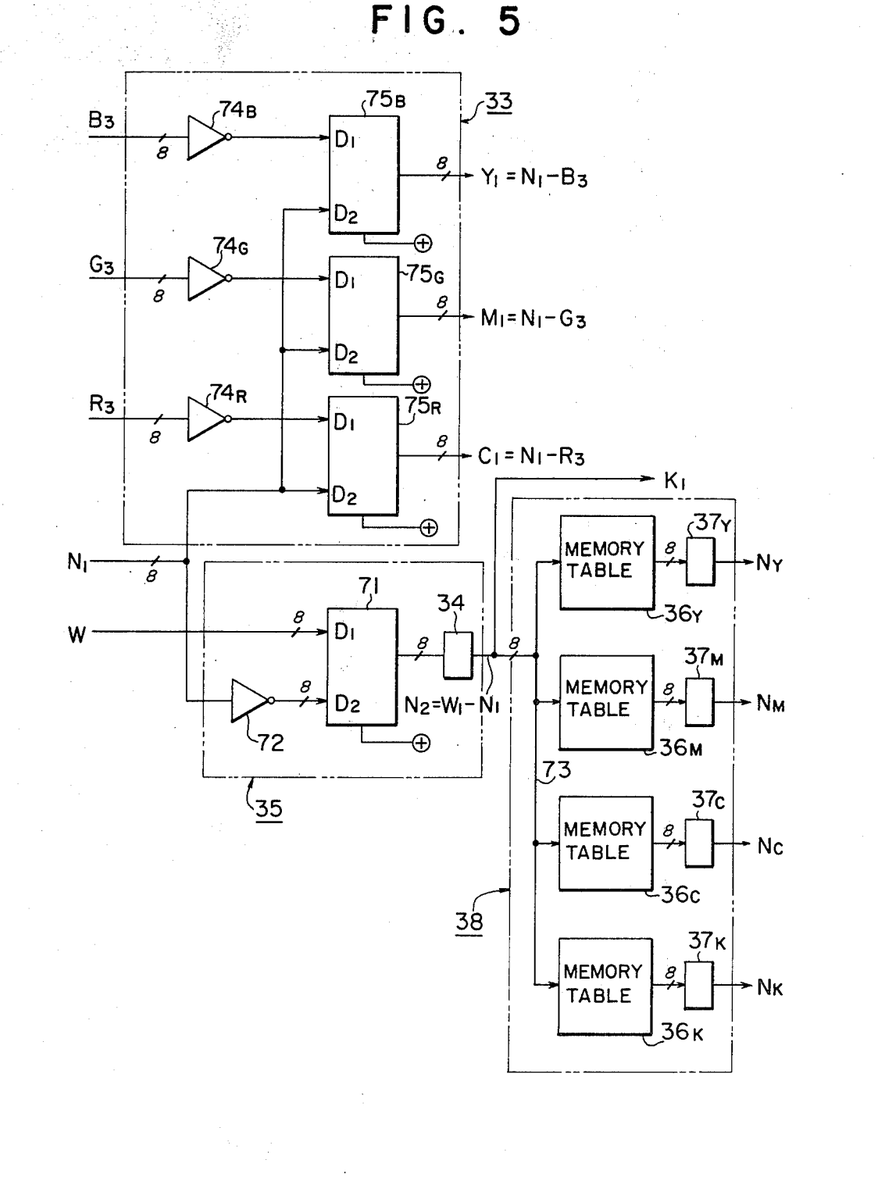
FIG. 5 is a block diagram of a color component separator, a gray component separator and a gray component data generator in FIG. 2.

In FIG. 5 is shown the gray component separator 35 of a subtractor type which carry out a complementary calculation, comprising an adder 71 and an inverter 72. The reference white level data W having 8-bits predetermined is fed to a terminal $D_1$ of the adder 71 and the maximum data $N_1$ is fed to a terminal $D_2$ of the adder 71 via the inverter 72. The adder calculates the true gray density data $N_2=W-N_1$. The reference white level data W is determined depending on the original picture.

The adder 71 does not output any signal when the reference level data W is smaller than the maximum data $N_1$, that is, it acts as a highlight limiter in such a case. The highlight limit effects of the adder 71 is applied to all color signals, and hence, if a highlight limit level of one of the color signals is changed, it is carried out in the gray component data generator 38. The output data $N_2$ of the adder 71 is latched in the latch circuit 34, and then is sent to the gray component data generator 38 at a proper timing. Since the data $N_2$ represents the true gray density, as described above, the data $N_2$ is sent to the color correction controller 29 as a black data $K_2$.

In the gray component data generator 38, as shown in FIG. 5, the data $N_2$ is sent to the memory tables 36Y, 36M, 36C and 36K via an address bus 73 and indexes the memory tables to output the gray component separation data Ny, Nm, Nc and Nk for yellow, magenta, cyan and black ink colors, which are latched in the 8-bits latch circuits 37Y, 37M, 37C and 37K, and then are sent to the data composer 30 in order to be added to the color-corrected data $Y_3$, $M_3$, $C_3$ and $K_3$. The gray component separation data corresponding to the gray density component are calculated and are stored in the memory tables 36Y, 36M, 36C and 36K in advance.

The relation between the data $N_2$ and the separation data Ny, Nm, Nc or Nk is expressed by a curved line usually represented by a higher functional formula, in the similar manner to a gradation curve between the original picture density and the color separation reproduction picture density. The memory tables, each having different characteristics line, are prepared for each color.

For instance, regarding the under color reduction, a set of four memory tables, each having a characteristics line, of four primary colors, are required for the desired rate of the under color reduction. In general, the under color reduction rate is varried roughly into 5-10 basic steps, in each step a set of four basic tables are prepared. Each basic table is readily corrected, for instance, the under color reduction is performed by varying its rate in proportion to the density of the original picture, by setting a certain rate of the under color reduction, or by a combination of the above two methods.

The address $N_1$ of each memory table 36Y, 36M, 36C or 36K corresponds to a certain gray density range of the original picture, and the data Ny, Nm, Nc or Nk read out of the address $N_1$ of the memory tables corresponds to a certain gray density range of the color separation reproduction picture. Hence, from the same addresses of a set of tables are read out gray component separation data Ny', Nm', Nc' and Nk' in the same density range, which are closely related one another depending on the variable rate or the fixed rate.

In such an under color reduction, a set of basic tables are prepared, and are corrected to a set of tables of the desired under color reduction rate on the basis of the combination of the data Ny', Nm', Nc' and Nk' of the desired under color reduction rate. This correction can be carried out in a short time by a program by using an extra digital conputer. The capacity required to the filing data of the correction program is small enough as compared with that of the filing data in the set of tables obtained by varrying the under color reduction rate. Furthermore, this operation is very easy.

Further, the gray component data generator 38 can be applied to other gradation curves represented by other higher functional formulae other than the ones predetermined, and hence is capable of carrying out any operations required to the color scanner in order to obtain the desired finish by operating properly the gray density and the gray components.

Each gradation curve in a table may be expressed by a graph similar to the gradation curve, or the like. Such a graph can be referred readily compared with a conventional analog processing. The finish effects obtained according to the characteristics line of each table is similar to those obtained by the conventional analog processing. Therefore, the experimental information for the finish effects obtained by operating the gray color components in a conventional manner, can be utilized continuously in the present method.

As shown in FIG. 5, the color component separator 33 comprises three inverters 74B, 74G and 74R and three adders 75B, 75G and 75R, for three colors, and performs subtraction operations of the data $B_3$, $G_3$ and $R_3$ from the maximum data $N_1$ by a complementary calculation to obtain three color data $Y_1 = N_1 - B_3$, $M_1 = N_1 - G_3$ and $C_1 = N_1 - R_3$, respectively. In this embodiment, however, as a matter of fact, since one of the data $Y_1$, $M_1$ and $C_1$ equals $N_1$ and thus two of the data $Y_1$, $M_1$ and $C_1$ except the one equals $N_1$ are output substantially from the color component separator 33.

Since, the R,G,B system and the Y,M,C system have a complementary relation each other in respect of colors and values, as shown in FIG. 6, such data $Y_1$, $M_1$ and $C_1$ obtained by converting the signals $R_3$, $G_3$ and $B_3$ from the R,G,B system into the Y,M,C system, include only the pure color components excluding the gray components.

Each color data $B_3$, $G_3$ or $R_3$ is fed to a terminal $D_1$ of the adder 75B, 75G or 75R wherein a binary coded number 1 is added in its lowermost bit, via the inverter 74B, 74G or 74R, and the maximum data $N_1$ is supplied to terminals $D_2$ of the adders 75B, 75G and 75R. In each adder 75B, 75G or 75R the subtraction is carried out by the complementary calculation to output the color data of 8-bits $Y_1$, $M_1$ or $C_1$ which is then sent to the masking operational controller 28.

In this embodiment, depending on the color reproduction range of the picture reproducing machine, visual color reproduction range required to the reproduction picture, and visible color distinguishing power of a man, and so forth, the resolving power of the data $Y_1$, $M_1$ and $C_1$ of the pure color components may be reduced, that is, the sampling steps of the data $Y_1$, $M_1$ and $C_1$ may be reduced, without substantially sacrificing the finish qualities.

For example, while the gray component data including brightness component for the black ink color is operated by using 8-bits, the color component data $Y_1$, $M_1$ and $C_1$ may be operated by using 6-bits in the masking operations controller 28 and the color correction controller 29. Then, in this case, each color corrected color component data $Y_3$, $M_3$ and $C_3$ having 6-bits is added by two more bits in its lower place to obtain a 8-bits data so that the gray component data Ny, Nm, Nc and Nk may be added to the color corrected data $Y_3$, $M_3$ $C_3$ and $K_3$ in the data composer 30.

In this embodiment, the capacities of the memory tables 40, 41, 42 and 46 in the masking operational controller 28 and the color correction controller 29 can be largely saved and thus other necessary elements can be also largely reduced.

Next, the masking operation will be described in detail in connection with FIG. 7.

In the conventional method, the following masking formulae have been used for the masking operation, wherein $Y_1$, $M_1$ and $C_1$ are three color data before masking operation, wherein $Y_2$, $M_2$ and $C_2$ are three color data after masking operation, and wherein $a_{11}$, $a_{12}$, ..., and $a_{33}$ are masking factors.

$$Y_2 = a_{11}Y_1 - a_{12}M_1 - a_{13}C_1 \tag{1}$$

$$M_2 = a_{21}M_1 - a_{22}C_1 - a_{23}Y_1$$

$$C_2 = a_{31}C_1 - a_{32}Y_k - a_{33}M_1$$

These formulae are simple equations, and the masking factors $a_{11}, \ldots,$ and $a_{33}$ cannot be varried by varrying the data $Y_1$, $M_1$ and $C_1$. However, in order to reproduce light and dark color points in the picture well, the masking factors $a_{11}, \ldots,$ and $a_{33}$ must be varried. Therefore, in such a case, the formulae (1) cannot be used, and may be carried out by quadratic masking formulae.

The masking operational controller 28 is adapted to operate such quadratic masking formulae. The operations for yellow, magenta, and cyan are carried out in the same manner, and thus the operation for yellow will be described in connection with FIG. 7.

A higher masking formula is already known as a Clapper's quadratic equation as follows.

$$Y_2 = a_1 Y_1 + a_2 M_1 + a_3 C_1 + a_4 Y_1^2 + a_5 M_1^2 + a_6 C_1^2 \tag{2}$$
$$+ a_7 Y_1 M_1 + a_8 M_1 C_1 + a_9 C_1 Y_1$$

This formula (2) is also written in the following.

$$Y_2 = (a_1 + a_4 Y_1)Y_1 + (a_2 + a_5 M_1)M_1 + \tag{3}$$
$$(a_3 + a_6 C_1)C_1 + a_7 Y_1 M_1 +$$
$$a_8 M_1 C_1 + a_9 C_1 Y_1$$

Then, the three items including two independent variables may be removed from the formula (3) since such items can be corrected in the following step, i.e. the color correction controller 29, thereby obtaining the following formula.

$$Y_2 = (a_1 + a_4 Y_1)Y_1 + (a_2 + a_5 M_1)M_1 + (a_3 + a_6 C_1)C_1. \tag{4}$$

When the data $Y_1$, $M_1$ and $C_1$ are settled in proper values, each item in the formula (4) is determined. Thus, this can be done by one-dimentional memory tables, viz. the tables are indexed by the data $Y_1$, $M_1$ and $C_1$ to output three 8-bits item data corresponding to $(a_1 + a_4 Y_1)Y_1$, $(a_2 + a_5 M_1)M_1$ and $(a_3 + a_6 C_1)C_1$ in the formula (4), stored in the tables, and then the three item data are added to obtain the data $Y_2$. In the same manner as this method, the data $M_2$ and $C_2$ are obtained.

Figure 7:
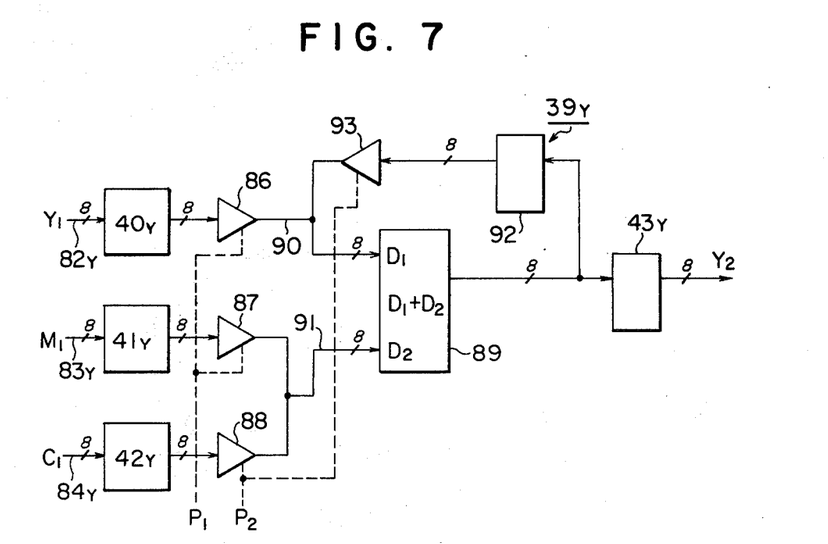
FIG. 7 is a block diagram of a yellow operator in a masking operational controller in FIG. 2.

In FIG. 7 is shown the separator 39Y for yellow ink color including three memory tables 40Y, 41Y and 42Y. To the memory tables 40Y, 41Y and 42Y are fed the three 8-bits data $Y_1$, $M_1$ and $C_1$ sent from the color component separator 33 via address busses 82Y, 83Y and 84Y, respectively. In the memory tables 40Y, 41Y and 42Y, the three item data are stored in advance, and then the tables are indexed by the color data $Y_1$, $M_1$ and $C_1$ to output the three item data, respectively, which are sent to bus buffers 86, 87 and 88 whose output lines so lead to an adder 89, as the buffer 86 to a terminal $D_1$ and the buffers 87 and 88 to a terminal $D_2$ thereof.

In the first cycle, the item data from the table 40Y and the item data from the table 41Y are sent to terminals $D_1$ and $D_2$ of an adder 89 via the buffers 86 and 87, respectively, while the buffers 86 and 87 are controlled so as to pass the two item data by the pulse $P_1$. The two item data are added in the adder 89, and then the resulting data is sent to a 8-bits latch circuit 92 and is latched therein.

In the second cycle, the data latched in the latch circuit 92 and the item data from the table 42Y are fed to the terminals $D_1$ and $D_2$ of the adder 89 via a bus buffer 93 and the bus buffer 88 while the buffers 93 and 88 are controlled so as to pass the data by the pulse $P_2$. Then, the two data are added in the adder 89 to obtain the data $Y_2$ which is sent to the latch circuit 43Y and is latched there.

In the separator 39M and 39C for magenta and cyan ink colors, each having the same construction and function as the separator 39Y for yellow color, the color data $M_2$ and $C_2$ are obtained from the data $Y_1$, $M_1$ and $C_1$ in the same manner as described above, and are latched in the latch circuits 43M and 43C, respectively.

In this embodiment, when the factors in each item of the formula (4) have the negative values, the adder 89 is acted as a subtractor to perform a subtraction of the item data.

According to the present invention, the masking operational controller 28 is not always arranged after the color and gray components controller 27, and may be positioned before the controller 27. In this case, the operation is carried out by using the color data $R_3$, $G_3$ and $B_3$ instead of the data $Y_1$, $M_1$ and $C_1$, accordingly.

Then, the color correction operation will be described in detail with reference to FIGS. 8-12.

Figure 8:
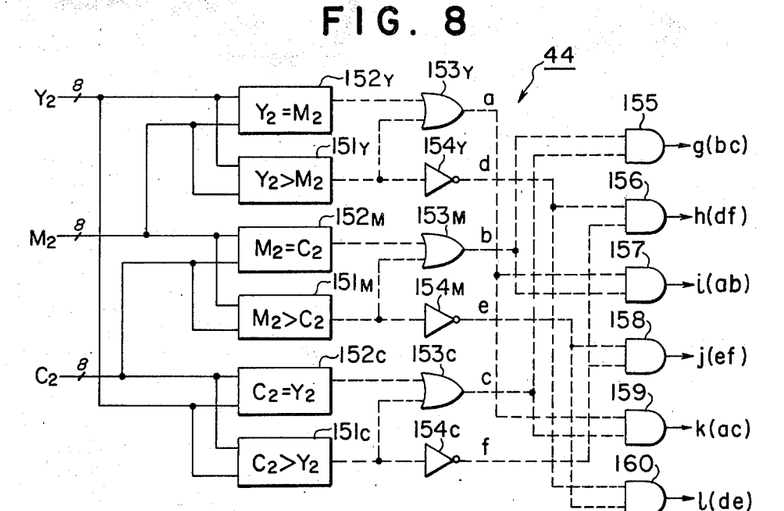
FIG. 8 is a block diagram of a first color discriminator of a hue discriminator in a color correction controller in FIG. 2.

In FIG. 8 is shown the first discriminator circuit 44 comprising three 8-bits magnitude comparators 151Y, 151M, and 151C, which discriminate $Y_2 > M_2$, $M_2 > C_2$ and $C_2 > Y_2$, respectively, three 8-bits coincidence detecting comparators 152Y, 152M and 152C, which discriminate $Y_2 = M_2$, $M_2 = C_2$ and $C_2 = Y_2$, respectively, three OR gates 153Y, 153M and 153C, three inverters 154Y, 154M and 154C, and six AND gates 155-160.

The data $Y_2$, $M_2$ and $C_2$ output from the masking operational controller 28 are sent to the magnitude comparators 151Y, 151M and 151C and the coincidence detecting comparators 152Y, 152M and 152C. Each magnitude comparator 151Y, 151M or 151C descriminates $Y_2 > M_2$, $M_2 > C_2$ or $C_2 > Y_2$ and sends a 1-bit discrimination signal to the OR gate 153Y, 153M or 153C and the inverter 154Y, 154M or 154C. Each coincidence detecting comparator 152Y, 152M or 152C detects $Y_2 = M_2$, $M_2 = C_2$ or $C_2 = Y_2$ and sends a 1-bit coincidence signal to the OR gate 153Y, 153M or 153C.

Each OR gate 153Y, 153M or 153C outputs a logic sum signal a, b or c to the AND gates 157 and 159; 155 and 157 or 155 and 159, respectively, and each inverter 154Y, 154M or 154C outputs an inverted discrimination signal d, e or f to the AND gates 156 and 160; 158 and 160 or 156 and 158, respectively, wherein $a = (Y_2 \geq M_2)$, $b = (M_2 \geq C_2)$, $c = (C_2 \geq Y_2)$, $d = (Y_2 < M_2)$, $e = (M_2 < C_2)$, and $f = (C_2 < Y_2)$. Then each AND gate outputs a logic product signal $g = bc$, $h = df$, $i = ab$, $j = ef$, $k = ac$, or $l = de$, which selects one of six hue divisions divided of the hue range corresponding to the combination of three color data $Y_2$, $M_2$ and $C_2$.

Figure 10:
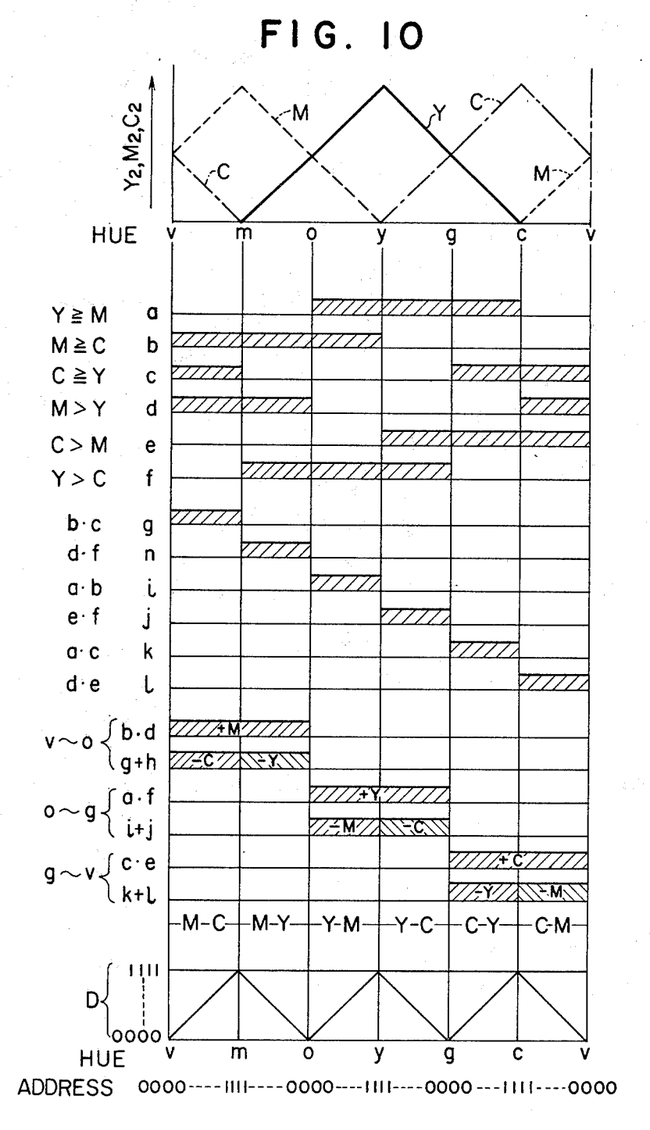
FIG. 10 shows schematically spectral waves and a relation between six hue divisions of the hue range and signals of a color correction controller in FIG. 2.

In FIG. 10 is shown schematically spectral waves Y, M and C and the relation between such six hue divisions of the hue range and the signals a, b, . . . , and l.

Figure 9:
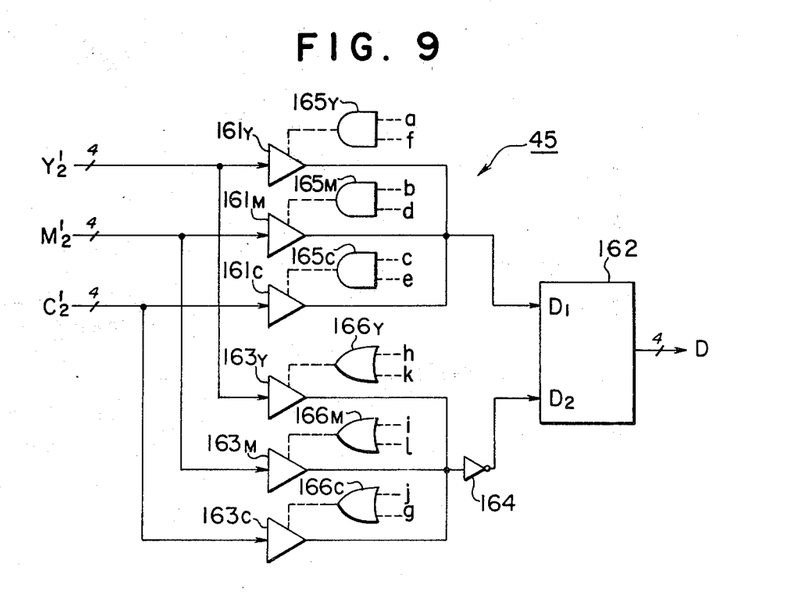
FIG. 9 is a block diagram of a second color discriminator of a hue discriminator in a color correction controller in FIG. 2.

In FIG. 9, there is shown the second discriminator circuit 45 comprising three 4-bits bus buffers 161Y, 161M and 161C, an adder 162, three 4-bits bus buffers 163Y, 163M and 163C, an inverter 164, three AND gates 165Y, 165M and 165C for controlling the three buffers 161Y, 161M and 161C, and three OR gates 166Y, 166M and 166C for controlling the three buffers 163Y, 163M and 163C.

One of three data $Y_2'$, $M_2'$ and $C_2'$ having upper 4-bits of the data $Y_2$, $M_2$ and $C_2$ is selectively fed to a terminal $D_1$ of the adder 162 through the buffer 161Y, 161M or 161C while the buffer 161Y, 161M or 161C is controlled to pass the data $Y_2'$, $M_2'$ or $C_2'$ by the AND gate 165Y, 165M or 165C when the signals a and f; b and d; or c and e are fed thereto. One of the three data $Y_2'$, $M_2'$ and $C_2'$ is also selectively fed to a terminal $D_2$ of the adder 162 through the inverter 164 and the buffer 163Y, 163M or 163C while the buffer 163Y, 163M or 163C is controlled to pass the data $Y_2'$, $M_2'$ or $C_2'$ by the OR gate 166Y, 166M or 166C when the signal h or k; i or l; or j or g is fed thereto.

Then, the adder 162 in which a binary coded number 1 is added in its lowermost bit for the complementary subtraction, performs the subtraction of the two data applied to the two terminals $D_1$ and $D_2$, and outputs a 4-bits data D.

In this embodiment, as a matter of fact, two of the data $Y_2$, $M_2$ and $C_2$ are substantially fed to the first discriminator circuit 44 and thus two of the data $Y_2'$, $M_2'$ and $C_2'$ are fed to the second discriminator circuit 45, since the color component separator 33 outputs only two of the data $Y_1$, $M_1$ and $C_1$, as described above.

As shown in FIG. 10, since the data D is represented by a 4-bits binary code, the data D may includes 16 information, or may have 16 values, and accordingly each hue division may be divided further into 16 hue sub-divisions while one of hue divisions violet-magenta (v-m), magenta-orange (m-o), orange-yellow (o-y), yellow-green (y-g), green-cyan (g-c), and cyan-violet (c-v) is selected by the signal g, h, i, j, k or l sent from the AND gate 155, 156, 157, 158, 159 or 160. The hue range is divided thus into 96 steps.

Figure 11:
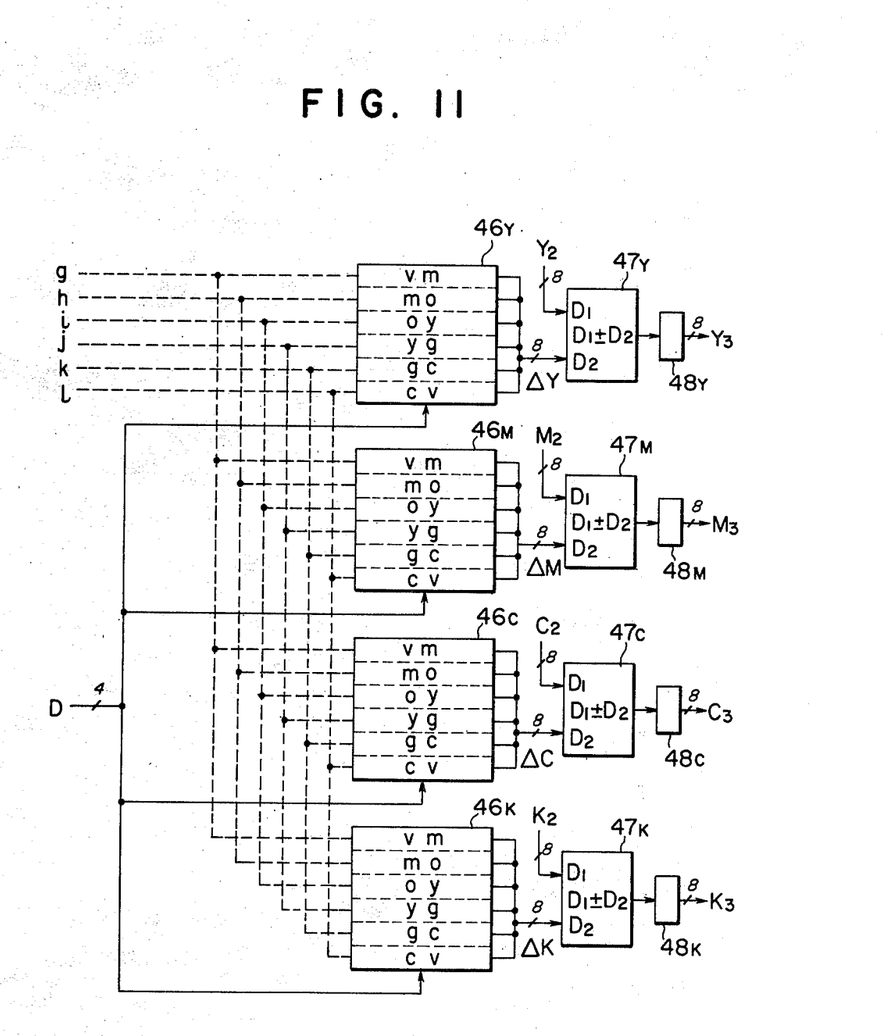
FIG. 11 is a block diagram of memory tables, add-subtractors, and latch circuits of a color correction data generator in a color correction controller in FIG. 2.

In FIG. 11 is shown the four memory tables 46Y, 46M, 46C and 46K, four add-subtractors 47Y, 47M, 47C and 47K, and four latch circuits 48Y, 48M, 48C and 48K. In each memory table 46Y, 46M, 46C or 46K, the color correction data $\Delta Y$, $\Delta M$, $\Delta C$ or $\Delta K$ predetermined are so stored as six rows of correction data blocks (vm), (mo), (oy), (yg), (gc) and (cv) corresponding to the six hue divisions (v-m), (m-o), (o-y), (y-g), (g-c) and (c-v) of the hue range, each correction data block including 16 correction data corresponding to 16 hue sub-divisions. Each table 46Y, 46M, 46C or 46K is indexed in such a manner that one of six correction data blocks corresponding to six hue divisions may be addressed by the signal g, h, i, j, k or l and one of 16 correction data corresponding to 16 hue sub-divisions may be simultaneously addressed by the data d, thereby being read out one correction data $\Delta Y$, $\Delta M$, $\Delta C$ or $\Delta K$.

Figure 12:
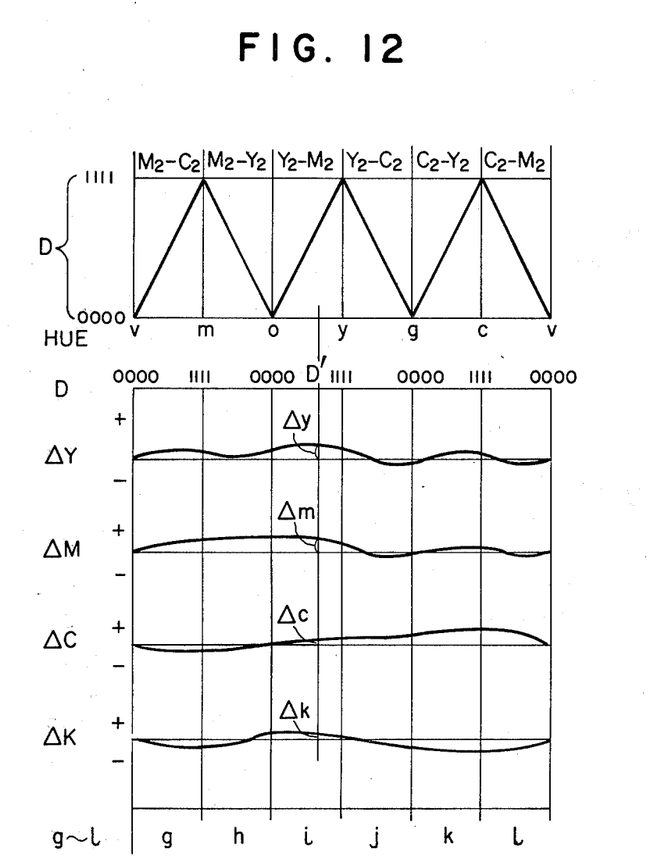
FIG. 12 shows schematically spectral waves of color correction data and a data output from a second color discriminator in a color correction controller in FIG. 2, with respect to hue range.

There is shown in FIG. 12 the four spectral waves of the color correction data $\Delta Y$, $\Delta M$, $\Delta C$ and $\Delta K$, and the values of the data D with respect to the hue range.

Each correction data $\Delta Y$, $\Delta M$, $\Delta C$ or $\Delta K$ has a value in a range of $-50 - +50$ percentage of the 8-bits data $Y_2$, $M_2$, $C_2$ or $K_2$, and hence each may be expressed by a 7-bits binary code. However, each correction data should be latched by a positive or a negative symbol which requires one more bit. Thus each correction data is represented in a 8-bits binary code.

Each correction data $\Delta Y$, $\Delta M$, $\Delta C$ or $\Delta K$ and the data $Y_2$, $M_2$, $C_2$ or $K_2$ are supplied to terminals $D_2$ and $D_1$ of the add-subtractor 47Y, 47M 47C or 47K and are added one to another or subtracted one from another therein to obtain the color-corrected data $Y_3$, $M_3$, $C_3$ or $K_3$, which is then latched in the latch circuit 48Y, 48M, 48C or 48K, and then sent to data composer 30 at a proper timing.

Further, the color correction controller 29 can carry out the masking correction operation, $a_7Y_1M_1 + a_8M_1C_1 + a_9C_1Y_1$ including two independent variables, appeared in the masking equation (3), as hereinbefore described.

In this case, masking correction data $\Delta Y'$ corresponding to $a_7Y_1M_1 + a_8M_1C_1 + a_9C_1Y_1$ for yellow color, are calculated and stored in the memory table 46Y, i.e. added to the color correction data $\Delta Y$ stored therein. Then, the correction data, the sum of $\Delta Y$ and $\Delta Y'$, is read out of the memory table 46Y by indexing by means of the color data $Y_2$, as described above. The other masking correction data $\Delta M'$ and $\Delta C'$ are calculated and stored in the memory tables 46M and 46C in the same manner as described above.

The spectral waves of the color correction data $\Delta Y$, $\Delta M$, $\Delta C$ and $\Delta K$ shown in FIG. 12 are drawn in a chart by consecutively plotting the data $\Delta Y$, $\Delta M$, $\Delta C$ and $\Delta K$ read out of the memory tables 46Y, 46M, 46C and 46K, as described above, by using a data plotter, or the like.

On the other hand, from the predetermined spectral waves shown in the chart, the color correction data $\Delta Y$, $\Delta M$, $\Delta C$ and $\Delta K$ are picked up and are stored in the memory tables 46Y, 46M, 46C and 46K in the reverse manner to the described above.

In general, combinations of the basic memory tables are prepared, and any of them may be corrected independently, as occasion demands, as described above. Further, of course, the tables may be corrected with reference to one another according to the relation among the tables, as occasion demands, in the similar manner to a conventional one.

From the spectral waves of the color correction data $\Delta Y$, $\Delta M$ $\Delta C$ and $\Delta K$ as shown in FIG. 12, the relation of the most proper correction conditions of a set of correction data may be readily known, and if one of correction data is corrected, the relation of the other correction data may be also readily known.

Although the present invention has been shown and described in terms of a preferred embodiment thereof, various changes and modifications thereof can be made by those skilled in the art without departing from the scope of the present invention.

What is claimed is:

1. A digital color control method for use in a picture reproducing process, comprising the steps of:
    (a) obtaining original picture color signals of primary colors by photo-electrically scanning an optical picture;
    (b) carrying out a gray component separation process comprising the steps of:
        (i) providing first memory tables each having one-to-one relation between its input and output for effecting desired correction and compensation in the final finish in the reproduction of the original picture,
        (ii) determining a reference highlight level of the original picture signals,
        (iii) setting up an under-color reduction ratio,
        (iv) obtaining a gray component data signal as the difference between the reference highlight level of the original picture color signals and the maximum of the levels of the primary color components of the original picture color signals,
        (v) obtaining a first signal corresponding to the amount of black ink to be used in the reproduction of the original picture as the product of the undercolor reduction ratio and the level of gray component data signal,
        (vi) obtaining a second signal corresponding to the level of the gray component data signal remaining after subtracting the first signal therefrom,
        (vii) obtaining third signals corresponding to the levels of the primary components remaining after subtracting the full gray component from the corresponding primary color components, and
        (viii) supplying the second signal to the first memory tables for obtaining from their outputs the amount of the ink of each of the primary colors and the amount of black ink for attaining a desired black color through the combined use of the ink of the primary colors and the black color;
    (c) a color masking process, comprising the steps of:
        (i) providing second memory tables each corresponding to one of the primary colors and having one-to-one relation between its input and output,
        (ii) supplying the third signals to the inputs of the second memory tables, and
        (iii) obtaining masking color signals as the sums of the outputs from the second memory tables;
    (d) a color correction process, comprising the steps of:
        (i) providing third memory tables, each having one-to-one relation between its input and output, for effecting a desired color correction and compensation in the finish of the reproduction of the original picture,
        (ii) determining which of a plurality of sectors in a color plane the masking color signals are identified with,
        (iii) carrying out an arithmetic process between the masking color signals,
        (iv) supplying the result of the arithmetic process to the inputs of the third memory tables each corresponding to the each of color data signals which are usable for the reproduction of the original picture, and
        (v) adding each of the outputs of the third memory tables to each one of the masking color signals to which the third memory table corresponds; and
    (e) composing the color data signals by combining the outputs from the second and third memories corresponding to the primary color of each of the color data signals for each of the primary colors.

2. A method according to claim 1, wherein an unsharp signal is obtained in the step of photo-electrically scanning the original picture, a sharpness emphasizing signal is obtained by combining the unsharp signals with part of the original picture color signals and the sharpness emphasizing signals is added to the color data signals for emphasizing the sharpness of the reproduction of the original picture.

3. A method according to claim 2, wherein the memory tables are prepared independently one from the others.

4. A method according to claim 3, wherein the said processes and steps are all carried out on a real-time basis.

5. A digital color control machine for use in combination with a picture reproducing machine, comprising:

(a) a color and gray component separator for separating a gray component from primary color components, comprising:
  (i) a maximum value selector for obtaining the maximum of the levels of the original picture color signals,
  (ii) a gray component separator for setting up a reference highlight level of the original picture color signals and for setting up an under-color reduction ratio, and
  (iii) a gray component data generator for determining the amounts of the ink of the primary colors for achieving a desired black color through the combined use of the ink of the primary colors and black ink, including a set of memory tables for associating the input thereof supplied from gray component separator to the amounts of the primary colors and the black ink;
(b) a masking operational controller, comprising:
  (i) a first group of memory tables having the same number of memory tables as the number of the primary colors, each of the memory tables in the first group having one-to-one relation between its input and output,
  (ii) at least one adder for adding up the outputs from the memory tables;
(c) a color correction controller, comprising:
  (i) a first discriminator for identifying which of a plurality of sectors in a color plane the color signals from the masking operational controller correspond to,
  (ii) a second discriminator for carrying out an arithmetic process between two primary color components of the original picture color signals supplied from the masking operational controller,
  (iii) a memory table, corresponding to each one of the sectors in the color plane, for associating the result of the arithmetic process with a set of certain color correction data; and
(d) a data composer for composing, for each of the primary colors and the black color, the outputs from the color correction controller and the color and gray components controller for producing signals for the reproduction of the original picture.

6. A machine according to claim 5, wherein a sharpness emphasizing circuit is provided for producing sharpness emphasizing signal and the data composer has an input adapted for receiving the sharpness emphasizing signal.

7. A machine according to claim 6 wherein the memory tables are adapted for individual replacement or renewal.

8. A machine according to claim 7, wherein the number of the sectors in the color plane is six and the number of the primary colors is three.

9. A machine according to claim 8, wherein the color control machine works in synchronism with an internal clock of the picture reproducing machine so that the color control machine operates on a real-time basis cooperatively with the picture reproducing machine.

10. A digital color control method for use in a picture reproducing process, for separating a gray component from original picture signals of primary colors, comprising the steps of:
  (a) providing memory tables, each having one-to-one relation between its input and output, for effecting a desired color correction and compensation in the final finish of the gray component in the reproduction of an original picture,
  (b) determining a reference highlight level of the original picture signals,
  (c) setting up an under-color reduction ratio,
  (d) obtaining a gray component data signal as the difference between the reference highlight level of the original picture color signals and the maximum of the levels of primary color components of the original picture color signals,
  (e) obtaining a first signal corresponding to the amount of black ink to be used in the reproduction of the original picture from the product of the under-color reduction ratio and the level of the gray component,
  (f) obtaining a second signal corresponding to the level of the gray component data signal remaining after subtracting the first signal therefrom, and
  (g) supplying the second signal to the memory table for obtaining the amount of the ink of each of the primary colors and the black color for attaining a desired black color in the reproduction of the original picture through the combined use of the ink of the primary colors and the clock color.

11. A method according to claim 10, wherein the second signal is addressed to four of the memory tables corresponding to the amounts of the ink of the primary colors and the black color.

12. A method according to claim 11, wherein color data signals for the reproduction of the original picture are obtained by subtracting each of the original picture color signals from the full range of the original picture signals.

13. A method according to claim 12, wherein the memory tables are individually prepared by photo-electrically reading a graphical curve defining a desired relationship between the level of the second signal and the amount of the ink of each of the primary colors and the black color for producing the desired black color through the combined use of the amounts of the ink thus determined.

14. A method according to claim 13, wherein the original picture color signals are processed as eight-bit binaries.

15. A method according to claim 14, wherein the primary color components are obtained each as the difference between the original picture color signal of the corresponding primary color and the level of the gray component signal.

16. A digital color control machine for use in a picture reproducing machine, for separating a gray component from original picture color signals, comprising:
  (a) a maximum value selector for determining the maximum of the levels of the original picture signals,
  (b) a gray component selector which carries out a subtraction between a reference highlight level and the maximum value obtained in the maximum value selector and
  (c) a plurality of memory tables each corresponding to each of the primary colors, the memory tables each having a one-to-one relation between its input and output for associating at least a part of the output from the gray component selector with a desired amount of the ink of the primary colors for producing a desired black color in the reproduction of the original picture.

17. A machine according to claim 16, wherein the gray component separator has an additional output for producing the product between the gray component signal and the under-color reduction ratio.

18. A machine according to claim 17, wherein the memory tables are each adapted for replacement or renewal independently one from the others.

19. A machine according to claim 18, wherein the color control machine is adapted for operating in synchronism with an internal clock of the picture reproducing machine so as to be operable on a real-time basis.

20. A machine according to claim 31 wherein the signals are processed as eight-bit binaries.

21. A digital color control method for use in a picture reproducing method, for correcting the color tone of an original picture, comprising the steps of:
  providing a plurality of memory tables so as each to have one-to-one relation between its input and output for effecting a desired correction and compensation in the finish of the color tone of the reproduction of the original picture,
  determining which of a plurality of sectors in a color plane color signals corresponding to the original picture correspond to,
  carrying out an arithmetic process between two primary color components of the original picture color signals,
  supplying the result of the arithmetic process to the memory tables, and
  adding each of the outputs of the memory tables to one of the original picture signals to which the memory table corresponds.

22. A method according to claim 21, wherein the arithmetic process is addition.

23. A method according to claim 22, wherein eight-bit binaries are used for identifying the color signals with one of the plurality of sectors in the color plane while the upper four bits thereof are used for carrying out the arithmetic process consisting of addition.

24. A method according to claim 23, wherein 24 memory tables are used for obtaining the color data signal, six memory tables for each primary color data signal, so that the result of the arithmetic process is addressed to one of the six memory tables, one of which is selectively enabled depending on which of the six sectors in the color plane the color signals correspond to.

25. A method according to claim 24, wherein the outputs from the memory tables are added to the corresponding original picture signals for obtaining the desired color data signals for the reproduction of the original picture.

26. A method according to claim 25, wherein each of the memory tables is individually replaced and renewed from a file of memory tables which are prepared in advance.

27. A method according to claim 26, wherein each of the memory tables is prepared by photo-electrically scanning a graphical curve of desired characteristics.

28. A digital color control machine for use in a picture reproducing machine, for correcting the color tone of an original picture in the reproduction of the original picture, comprising:
  a first discriminator for identifying which of a plurality of sectors in a color plane color signals obtained from the original picture are located in,
  a second discriminator for carrying out an arithmetic process between two primary color components of the original picture signals, and
  a plurality of memory tables, each corresponding to one of the sectors in the color plane, for associating the output from the second discriminator with a set of certain color correction data.

29. A machine according to claim 28, wherein the color control machine is adapted for processing original picture signals that are obtained after subtracting a gray component therefrom and comprised of two primary components of the original picture signals.

30. A machine according to claim 29, wherein the number of the sectors in the color plane is six.

31. A machine according to claim 30 wherein the second discriminator is an adder for adding the two primary color components which are obtained by the first discriminator.

32. A machine according to claim 31, wherein four sets of memory tables, each consisting of six memory tables which can be selectively enabled, are used for producing color reproduction data of each of the primary colors and a black color.

33. A machine according to claim 32, wherein the first discriminator is adapted for processing eight-bit binary data while the second discriminator is adapted for processing four-bit binary data.

34. A machine according to claim 33, wherein an adder is provided, after the set of six memory tables for the color reproduction data of each of the primary colors, for adding the output from the memory tables to the original picture color signal of the same primary color.

35. A machine according to claim 34, wherein each of the memory tables is adapted for individual replacement and renewal.

36. A machine according to claim 35, wherein the machine works in synchronism with an internal clock of the picture reproducing machine so that the color control machine operates on a real-time basis cooperatively with the picture reproducing machine.

* * * * *